United States Patent [19] [11] 3,892,132
Coton [45] July 1, 1975

[54] VEHICLE JACK
[75] Inventor: William Henry Coton, Bartley Green, England
[73] Assignee: Dunlop Limited, London, England
[22] Filed: Apr. 16, 1973
[21] Appl. No.: 351,362

[30] Foreign Application Priority Data
Apr. 22, 1972 United Kingdom............ 18805/72

[52] U.S. Cl................ 73/457; 254/10 R; 254/126
[51] Int. Cl........................ G01m 1/16; B60p 1/48
[58] Field of Search............ 248/354 R, 354 S, 7 R; 254/8-10, 124, 126; 214/512; 73/457

[56] References Cited
UNITED STATES PATENTS
1,751,480  3/1930  Howell................................ 254/7 R
3,317,004  5/1967  Harrison.............................. 254/126
3,552,556  1/1971  Hall..................................... 214/512
3,758,076  9/1973  Tranchero............................. 254/8 R FOREIGN PATENTS OR APPLICATIONS
666,155   10/1938  Germany.............................. 254/8 R
1,237,968  7/1971  United Kingdom.................. 254/124

Primary Examiner—Othell M. Simpson
Attorney, Agent, or Firm—Stevens, Davis, Miller & Mosher

[57] ABSTRACT

A vehicle jack comprising a stand on which a vehicle member may be supported after being raised, the stand being dissociateable from the raising and lowering device to take all the weight exerted on the vehicle member. The stand may comprise a member for use in balancing a vehicle wheel.

10 Claims, 4 Drawing Figures

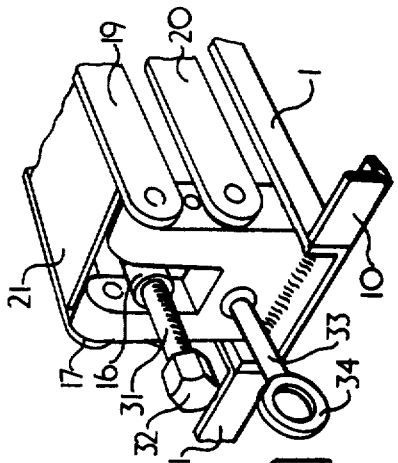
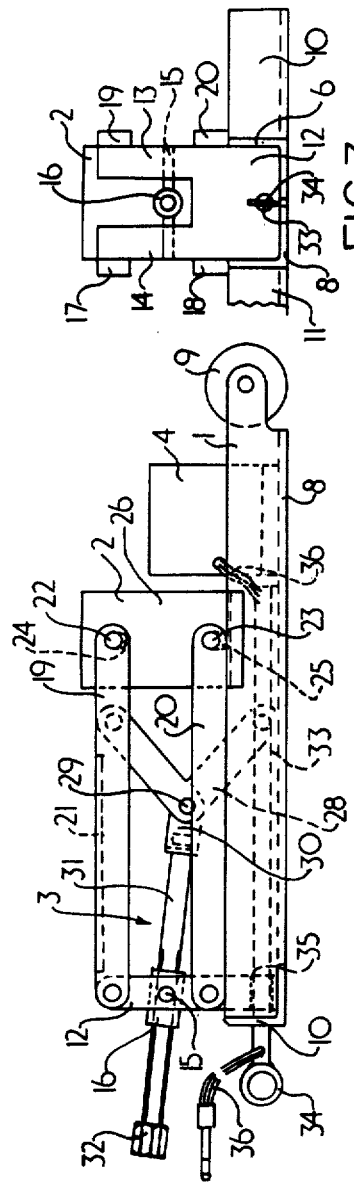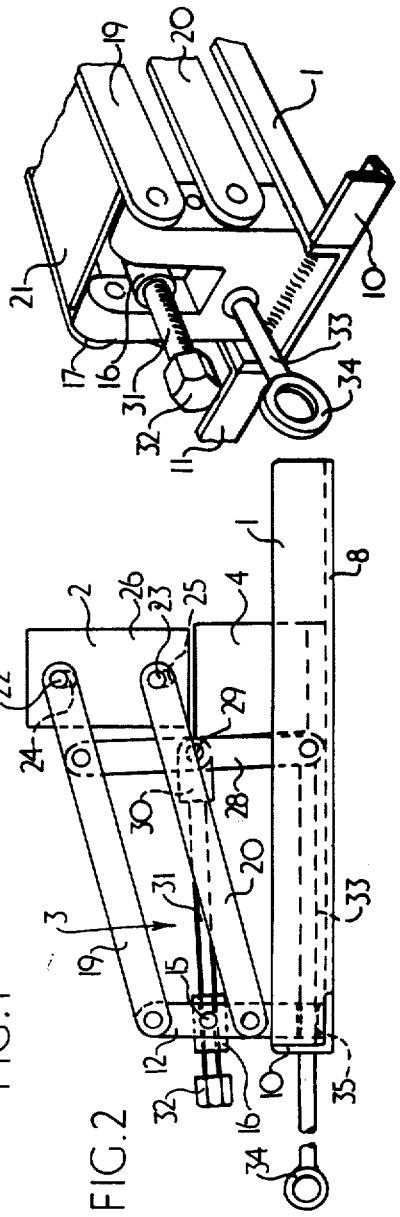

VEHICLE JACK

This invention relates to a vehicle jack.

In accordance with the invention a vehicle jack comprises a support member to engage the vehicle member to be raised, means for raising and lowering the support member and a stand by means of which the support member may be supported after having been raised, the support member being mounted on the raising and lowering means in such a manner as to permit the raising and lowering means to be dissociated from the support member whereby the whole of the vertical forces acting on the support member may be transmitted to the stand.

The stand may comprise a force sensor especially for use in balancing a vehicle wheel when the wheel is in position on the vehicle, so that when the stand is supporting a wheel or suspension the sensor can sense the whole of the vertical force, if any, arising from rotation of the wheel in an unbalanced condition and part of the weight of the vehicle acting on the sensor. The sensor may be a separable part of the stand.

A vehicle jack in accordance with the invention may comprise a base member, a support member to engage a vehicle member to be supported, raising and lowering means including at least one arm pivotally mounted at one end to the base member and carrying the support member at the other end, operation of the raising and lowering means causing the arm to pivot and raise or lower the support member, and a stand capable of being positioned beneath the support member when in a raised condition, the mounting of the support member being one which permits dissociation of the load bearing surfaces between the support member and the arm whereby on operation of the raising and lowering means to lower the support member into engagement with the stand, the stand supports the support member and vehicle member, if engaged by the support member, and on further operation of the raising and lowering means in a manner to lower the support member the arm becomes dissociated from the support member and the stand completely supports the support member and any load carried thereby.

It will be appreciated that a jack in accordance with the invention is particularly applicable to road vehicles such as cars. Since the wheels of such vehicles are usually fitted with pneumatic tyres, the term "wheel" as used above and throughout the remainder of this specification includes a wheel, its brake drum or brake disc and tire assembly.

One embodiment of the invention, a jack suitable for use in balancing the wheels of cars and other light road vehicles will now be described by way of example with reference to the accompanying informal drawings, of which:

FIG. 1 is a side view of the jack in its initial position ready for use; and

FIG. 2 is a side view of the jack in position supporting a vehicle suspension, the force sensor being in a position ready to take the weight of the vehicle acting on the suspension;

FIGS. 3 and 4 are an end and a fragmentary perspective view respectively of the jack as shown in FIG. 1.

The jack shown in the figures comprises a base member 1, a support member comprising a suspension-engaging tool 2, a toggle linkage 3 attached to the base member for raising and lowering the tool 2 and a vehicle suspension (not shown), and a force sensor 4.

The base member 1 comprises a length of metal channelling 5 of U-shaped cross-section, the sides 6,7 of the channel extending vertically upwards and the base 8 of the channel, which is wider than the height of the two sides, lying on the ground or workshop floor when the jack is in use. At one end of the base member a roller 9 is secured with its axis extending perpendicularly to the length of the base member 1 and to its two sides 6,7. In use of the jack the roller axis is horizontal and enables the jack to be readily positioned beneath the vehicle, it being appreciated that the ground or workshop floors are seldom smooth. At the other end of the base members are welded two stabilizing members 10,11 of U-shaped cross-section. These members, one on each side of the channelling, extend perpendicularly to the length of the channelling so that the overall configuration of the base member when viewed in plan is that of a letter 'T'. In use the stabilizing members help prevent the jack from tilting sideways and thus the car or other vehicle falling off the jack.

At the end of the base member to which the stabilizing members are welded and within the channelling is welded a rigid base support member 12 for the toggle linkage. This base support member is also in the form of a letter U. Extending across the member between the two upright limbs 13,14 thereof is a horizontal shaft 15 at the middle of which is rigidly mounted a tubular internally threaded boss 16. The shaft 15 is freely rotatably mounted on the base support member 12 so that the shaft 15 and the boss 16 can freely rotate about an axis which is horizontal when the jack is in its operative position.

On the outer sides of the base support member 12 are pivotally mounted two pairs of arms 17,18 and 19,20 one pair on each side. All four arms are maintained parallel to one another as can be seen from the drawings, and can rotate about horizontal axes when the jack is in its operative position. The two arms in each pair are arranged so that one is directly above the other (i.e. arm 17 is above arm 18, and arm 19 above arm 20). A plate 21 is welded between the two upper arms 17 and 19 of each pair to provide necessary rigidity.

Each arm 17, 18, 19 and 20 is slightly longer than half the length of the base member 1 and extends from the base support member 12 towards the roller 9. Each arm is provided at its end further from the base support member with a spigot which extends inwardly towards the corresponding arm on the other side of the jack. These four spigots 22,23 (only two shown) engage in four elongated slots 24,25 (only two shown) two on each side of a rectangular block 26 which forms part of the suspension engaging tool 2. Since the two slots in each pair 24 and 25 are arranged vertically above one another when the jack is in its operative position and the slot elongation is also in vertical direction, the rectangular block 26 remains upright on rotation of the pairs of arms 17, 18, 19, 20 relative to the base support member 12. The top surface 27 of the block 21 is provided with suitable projections (not shown) to engage the car suspension.

Rotation of the arms 17, 18, 19, 20 (and raising of the tool 2 and suspension in engagement with the tool) is achieved by means of coupled toggles 28 (only one shown) between the two upper arms 17,19 and the two sides 6,7 of the channelling of the base member. The two toggles 28 are coupled together at their centers by a shaft 29 at the center of which is a boss 30 within which one end of a toggle shaft 31 is secured so as to be freely rotatable. This toggle shaft 31 is screw-threaded over part of its length and engages the tubular boss 16 positioned between the two limbs 13,14 of the base support member 12. The end of the toggle shaft 31 further from the toggles is provided with a hexagonal head 32 enabling the shaft to be readily started with a spanner or other suitable tool. Rotation of the toggle shaft 31 operates the toggles and raises the links 17, 18, 19, 20, the suspension-engaging tool 2 and suspension.

Located within the channelling of the base member 1 at the end adjacent the roller is the force sensor 4. A handle 33 in the form of a hollow rigid tube extends along the base of the channel member from the foot of one side of the sensor 4 through a hole 35 in the support member 12 and beyond the end of the base member. A ring 34 is secured to the end of the handle further from the sensor. Electrical leads 36 connecting the sensor to a recording meter (not shown) and other parts of the balancing equipment pass through the handle 33 and are protected by it.

In operation the jack is positioned beneath the suspension of the wheel to be balanced. The toggle shaft 31 is rotated so as to raise the arms 17, 18, 19, 20, the suspension-engaging tool 2 and the suspension. When the tool has been raised a sufficient amount the sensor 4 is slid along the channelling of the base member until it is directly beneath the rectangular block 26 of the suspension-engaging tool 2 by pulling on the handle 33. The toggle shaft 31 is then rotated in the opposite direction to lower the tool 2 on to the sensor 4. A small further rotation causes the spigots 22,23 on the arms 17-20 to move within the elongated slots 24,25 in the rectangular block 26, away from the upper end thereof and separate the opposed load bearing surfaces of the upper end of each slot and the upper surface of the spigot located in the slot. Thus all the weight of that part of the vehicle acting on the suspension is transmitted to the sensor 4 and not through the arms 17-20 and/or toggles 28. The sensor thus comprises the stand on which the suspension is supported.

After rotating the car wheel and carrying out any necessary wheel balancing, the toggle shaft 31 is again rotated to lift the tool 2 and suspension, the force sensor 4 is slid back to its original inoperative position adjacent the roller 9 and the toggle shaft 31 again rotated to lower the vehicle wheel to the ground.

The jack according to the invention has the advantage that it is more compact than a separate conventional jack and sensor, the wheel is raised a minimum distance from the ground so that in the unlikely event of the suspension falling off the tool there is only a minimum falling distance and the sensor leads in passing through the hollow handle are protected by it, especially from damage by the revolving wheel.

Having now described my invention, what I claim is:

1. A vehicle jack comprising a support member to engage a vehicle member to be raised, means, to which the support member is connected, for raising and lowering the support member and a stand by means of which the support member may be supported after having been raised, the raising and lowering means being movable when the support member is supported by the stand between a first position wherein at least some of the vertical forces acting on the support member are taken by the raising and lowering means, and a second position wherein the whole of the vertical forces acting on the support member are transmitted to the stand.

2. A vehicle jack comprising a base member, a support member to engage a vehicle member to be supported, raising and lowering means including at least one arm pivotally mounted at one end to the base member and having the support member connected thereto at the other end, operation of the raising and lowering means causing the arm to pivot and raise or lower the support member, and a stand capable of being positioned beneath and supporting the support member when in a raised condition, the arm and the support member having separable load bearing surfaces therebetween, the arm being movable when the support member is supported by the stand between a first position wherein the load bearing surfaces are in contact and at least some of the load on the support member is taken by the arm, and a second position wherein the load bearing surfaces are separated.

3. A vehicle jack according to claim 2 wherein the arm is provided with two spigots and the support member is formed with two slots, elongated in a substantially vertical direction, the spigots being located one in each slot whereby the support member is carried by the arm, movement of the arm to said second position causing each spigot to move in its slot away from an end thereof.

4. A vehicle jack according to claim 3 comprising at least one pair of horizontally spaced apart arms constrained to remain in substantially parallel relationship during a raising and lowering operation, the two spigots being provided one on each arm of the pair and the support member being positioned between the two arms.

5. A vehicle jack according to claim 4 comprising two pairs of arms, one pair located vertically above the other, spigots being provided one on each arm, the support member being formed with two pairs of slots which locate one spigot in each slot, the spigots on each pair of arms being coaxial.

6. A vehicle jack according to claim 1 wherein the raising and lowering means comprises a toggle linkage.

7. A vehicle jack according to claim 1 comprising sliding means on which the stand is slideably moveable into a position where the stand is capable of supporting the support member after having been raised.

8. A vehicle jack according to claim 1 wherein the stand comprises a force sensor for use in balancing a wheel when the wheel is in position on the vehicle, the sensor being capable of sensing the whole of the vertical force, if any, arising from the rotation of the wheel in an unbalanced condition and that part of the weight of the vehicle acting on the sensor.

9. A vehicle jack according to claim 8 wherein the sensor is a separable part of the stand.

10. A vehicle jack according to claim 8 comprising a handle attached to the stand enabling the sensor to be moved to a position where the sensor is capable of sensing the whole of the vertical forces, if any, arising from the rotation of the wheel in an unbalanced condition and that part of the weight of the vehicle acting on the sensor, electrical leads connecting the sensor to a recording meter passing through the handle.

* * * * *